(12) United States Patent
Michioka

(10) Patent No.: US 7,329,047 B2
(45) Date of Patent: Feb. 12, 2008

(54) ROLLING MEMBER CONNECTION BELT AND MOTION GUIDE DEVICE PROVIDED WITH SAME

(75) Inventor: Hidekazu Michioka, Tokyo-to (JP)

(73) Assignee: THK Co., Ltd., Tokyo-to (JP)

( * ) Notice: Subject to any disclaimer, the term of this patent is extended or adjusted under 35 U.S.C. 154(b) by 677 days.

(21) Appl. No.: 10/773,300

(22) Filed: Feb. 9, 2004

(65) Prior Publication Data

US 2004/0170343 A1    Sep. 2, 2004

(30) Foreign Application Priority Data

Feb. 28, 2003    (JP)    ............ P2003-052936

(51) Int. Cl.
*F16C 29/06*    (2006.01)
*F16C 19/00*    (2006.01)

(52) U.S. Cl. .......................... 384/43; 384/51

(58) Field of Classification Search ............ 384/43–45, 384/49, 51, 523, 526, 528, 532, 534
See application file for complete search history.

(56) References Cited

U.S. PATENT DOCUMENTS

| | | | | |
|---|---|---|---|---|
| 1,168,937 A | * | 1/1916 | Eitner | .................. 384/532 |
| 1,197,466 A | * | 9/1916 | Englerth et al. | ............ 384/532 |
| 2,726,906 A | * | 12/1955 | Winchell | .................. 384/526 |
| 4,004,840 A | * | 1/1977 | Johnston et al. | ............ 384/526 |
| 5,044,783 A | * | 9/1991 | Willner | .................. 384/523 |
| 5,491,893 A | * | 2/1996 | Hurrell, II | ............. 29/898.061 |
| 5,499,452 A | * | 3/1996 | Godec et al. | .......... 29/898.067 |
| 6,116,783 A | * | 9/2000 | Shirai et al. | .................. 384/43 |
| 2002/0025088 A1 | * | 2/2002 | Kuo | .............................. 384/51 |

FOREIGN PATENT DOCUMENTS

JP    2000-65053    3/2000

* cited by examiner

*Primary Examiner*—Thomas R. Hannon
*Assistant Examiner*—Justin Krause
(74) *Attorney, Agent, or Firm*—Westerman, Hattori, Daniels & Adrian, LLP.

(57) ABSTRACT

A motion guide device is provided with a rolling member connection belt for holding a series of rolling members which circulate in a circulation passage provided with a loaded rolling passage, a non-loaded return passage and a pair of rolling direction changing members connecting the loaded rolling passage and the non-loaded return passage to thereby constitute the circulation passage. The rolling member connection belt is formed from a metal plate member having a corrugated-shape, in section in a longitudinal direction thereof, formed at least to one portion thereof or entire portion thereof in the longitudinal direction, and the corrugated-shape has peak and valley portions each extending in a direction normal to the longitudinal direction of the metal plate member.

4 Claims, 6 Drawing Sheets

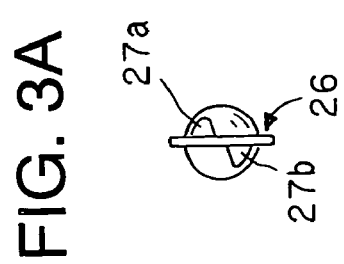
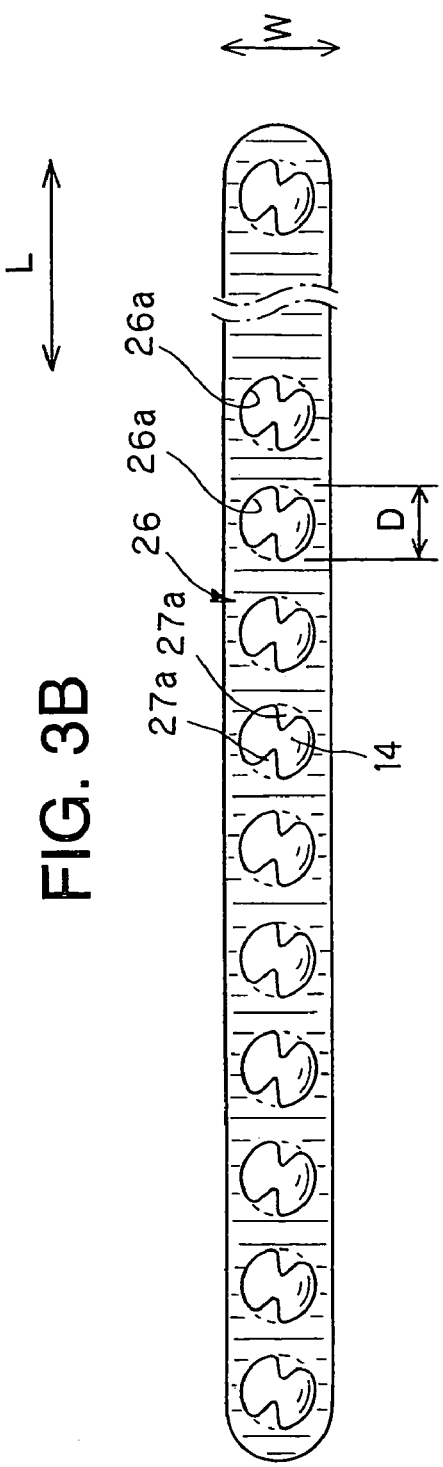
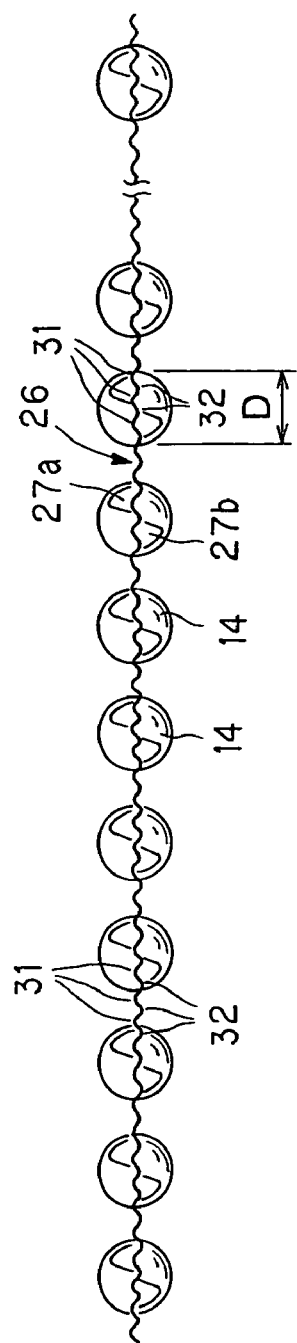

ROLLING MEMBER CONNECTION BELT AND MOTION GUIDE DEVICE PROVIDED WITH SAME

BACKGROUND OF THE INVENTION

1. Field of the Invention

The present invention relates to a connection belt connecting rolling members for holding the rolling members, to be rotatably, rolling along a path defined by a track member and a movable member of, for example, a linear guide, ball spline and the like and also relates to a motion guide device provided with such rolling member connection belt.

2. Related Art

A linear guide is generally composed of a track rail, a movable block assembled to the track rail to be movable relative to the track rail and a number of balls as rolling members disposed between the track rail and the movable block.

FIG. 8 shows one example of such linear guide, in which balls 1 roll in a passage or path defined by the track rail 2 and the movable block 3 and are scooped up by an end cap 4 at each of the end portions of the movable block 3. The balls 1 then roll in a ball return passage 5 formed in the movable block 3 and return to the ball rolling passage formed between the track rail 2 and the movable block 3 through another end cap 4 formed at the other end portion of the movable block 3.

A rolling member retainer is a member for holding and retaining the balls 1 so that the balls 1 roll and move smoothly in the ball rolling passage without contacting to each other.

In a linear guide provided with a separate-type retainer, a plurality of retainers each disposed between the balls are arranged independently, i.e., separated from each other in arrangement.

On the other hand, in a linear guide provided with a connection-type retailer, as shown in FIG. 9, a plurality of retainers 6, 6, - - - disposed between the balls 1 are connected by a belt 7. Each of these retailers 6 is disposed between adjacent balls 1 to thereby prevent the balls 1 from contacting each other. In such connection-type retainer, the balls 1 can be guided in the ball advancing direction with a constant distance being maintained between the adjacent balls 1, thus the movable member being smoothly moved.

In general, such retainer for the rolling members (which may be called hereinlater merely "retainer") is manufactured through an injection molding process using a resin material such as elastomer. In the connection-type retailer, it has been required to make compact the retainer according to recent requirement of compact-sized linear guide. However, in the structure made to satisfy such requirement for compactness, there may often causes short-circuited and, moreover, it becomes difficult to carry out the injection molding. In addition, it is also difficult to ensure high strength at the connection portion of the retainer and the belt therefor.

In order to solve the defects or inconvenience described above, the applicant of the subject application has provided a rolling member retainer manufactured through a pressing working of a metal plate member such as disclosed in Japanese Patent Laid-open (KOKAI) Publication No. 2000-65053, in which the rolling member retainer made from the metal material is formed with a number of ball retaining (holding) holes at a predetermined distance between the adjacent ones and the ball is retained in each of the ball retaining holes to be rotatable.

Generally, as shown in FIG. 8, a circulation passage of a linear guide through which the balls circulates has a circuit structure configured such that a loaded rolling passage and a non-loaded return passage, both extending linearly, are connected, at both end portions, by a pair of U-shaped rolling direction changing passages. Because of such structure, the rolling member retainer circulates in the circulation passage in the linearly extending fashion in the loaded rolling passage and non-loaded return passage and also in the bent fashion in U-shape in the direction changing passages. The rolling member retainer is moved and circulated while repeatedly taking the above fashions in the circulation passage.

In the above meaning, if the rolling member retainer is made of metal material, there may cause a case that the retainer are not sufficiently bent in the desired shape during the circulating motion in the direction changing passages, and hence, the smooth circulation of the rolling members therein may be obstructed.

SUMMARY OF THE INVENTION

An Object of the present invention is therefore to substantially eliminate defects or inconveniences encountered in the prior art described above and to provide a rolling member connection belt made of metal material, for holding rolling members, capable of being bent with flexibility, during the circulation of corner portions in a circular passage.

Another object of the present invention is to provide a motion guide provided with such rolling member connection belt.

The above and other objects can be achieved according to the present invention by providing, in one aspect, a rolling member connection belt for holding, to be rotatable, a series of rolling members which circulate in a circulation passage provided with a loaded rolling passage composed of a rolling member rolling portion formed on a track member and another rolling member rolling portion formed on a movable member, a non-loaded return passage formed in the movable member and a pair of rolling direction changing members connecting the loaded rolling passage and the non-loaded return passage to thereby constitute the circulation passage, the rolling member connection belt being made of a metal plate member having a corrugated-shape, in section in a longitudinal direction thereof, formed at least at a portion in the longitudinal direction, the corrugated-shape having peak and valley portions each extending in a direction normal to the longitudinal direction of the metal plate member.

In a further aspect of the present invention, there is also provided a motion guide device comprising:

a track member formed with a rolling member rolling portion;

a movable member formed with another rolling member rolling portion and assembled to the track member to be rotatable relatively thereto;

a number of rolling members which circulate in a circulation passage provided with a loaded rolling passage composed of both the rolling member rolling portions formed on the track member and the movable member, a non-loaded return passage formed in the movable member and a pair of rolling direction changing members connecting the loaded rolling passage and the non-loaded return passage to thereby constitute the circulation passage; and a rolling member connection belt holding the rolling members to be rotatable in the circulation passage, the rolling member connection belt being made of a metal plate member having a corrugated-shape, in section in a longitudinal direction thereof, formed at least at a portion in the longitudinal direction, the corrugated-shape having peak and valley portions each extending in a direction normal to the longitudinal direction of the metal plate member.

According to the above aspects, the connection belt member has a good flexibility even formed from a metal plate, so that the rolling member connection belt can smoothly circulate in a circuit-shaped rolling member circulation passage. Furthermore, since the rigidity of the rolling member connection belt in its width direction is increased, the rolling members can sufficiently be suppressed from wandering during its circulation motion. Moreover, the moving (rolling) speed of the rolling member may be changed at the time when the rolling member moves from the non-loaded area to the loaded area or vise versa. Such speed changing can be effectively absorbed by forming the connection belt with corrugated peak-and-valley portions which extend in its width direction thereof and are flexible (contractable) in its longitudinal direction. Accordingly, the rolling member can be smoothly moved from the non-loaded area to the loaded area, thus being advantageous.

Furthermore, in preferred embodiments of the above aspects, the metal plate member is provided with a number of rolling member holding holes formed along the longitudinal direction thereof and a plurality of sets of peak-and-valley portions exist in each of the rolling member holding holes.

The rolling member holding hole is provided, at peripheral portions thereof, with a plurality of claw portions so as to surely hold the rolling member in the hole.

The peak-and-valley portions may be formed along an entire longitudinal direction of the connection belt.

According to these preferred embodiments, the rolling members can be held by the plural sets of peak-and-valley portions (corrugated structure) in the accommodation hole, so that the rolling members can be more surely held in comparison with the conventional structure in which the rolling members are supported by a flat-plate shaped connection belt member.

The natures and further characteristic features of the present invention will be made more clear from the following descriptions made with reference to the accompanying drawings.

BRIEF DESCRIPTION OF THE DRAWINGS

In the accompanying drawings:

FIG. 3 shows a rolling member connection belt and includes FIG. 3A being a front view, FIG. 3B being a plan view and FIG. 3C being a side view;

DESCRIPTION OF THE PREFERRED EMBODIMENT

Preferred embodiments of the present invention will be described in detail hereunder with reference to the accompanying drawings.

Figure 1:
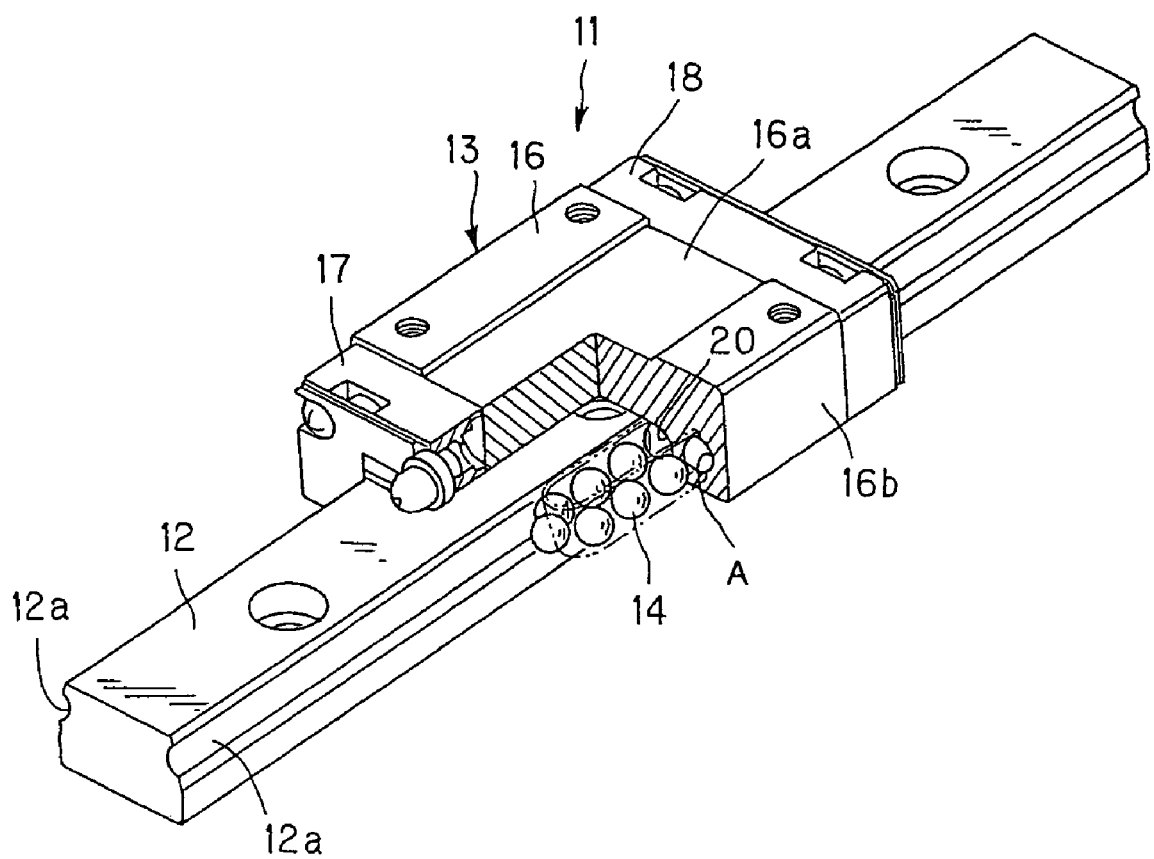
FIG. 1 is a perspective view showing a linear guide provided with a rolling member connection belt as a retainer according to one embodiment of the present invention.

FIG. 1 shows a linear guide 11 to which a rolling member connection belt as a retainer according to the present invention is assembled. The linear guide 11 is a motion guide device for guiding a linear or curvilinear motion of a member, such as table. The linear guide 11 is composed of a track rail 12 as a track member and a movable block 13 as a movable member which is assembled to be movable relative to the track rail 12. The movable block 13 is mounted, as an object member for guidance, to the track rail 12. A number of balls 14, 14 - - -, as rolling members, are disposed between the track rail 12 and the movable member 13 to be rollable.

The track rail 12 has a linearly extending structure in the longitudinal direction thereof and having, for example, a rectangular section. The track rail 12 is formed with plural rows of ball rolling grooves 12a, 12a - - -, as rolling member rolling portion, forming a track for the rolling of the balls 14, 14, - - - . Such track rail 12 is manufactured through machine workings including drawings, cutting, grinding and so on. Further, in a case where a curvilinear motion of an object member is guided, a track rail 12 having a curved structure will be utilized.

The movable block 13 entirely has a straddle-type structure having substantially U-shaped cross-section, and the movable block 13 is composed of a movable block body 16 and end plates 17 and 18 disposed at both ends of the block body 16. This movable block body 16 is provided with a flat horizontal portion 16a opposing to the upper surface of the track rail 12 and a pair of leg (skirt) portions 16b facing both side surfaces of the track rail 12 when the movable block 13 is assembled to the track rail 12.

The lateral pair of leg portions 16b have inside surface portions formed with loaded ball rolling grooves 20, as rolling member rolling portions, corresponding to ball rolling grooves 12a formed on the respective side surfaces of the track rail 12. The lateral pair of leg portions 16b are also formed with ball return passages A, as rolling member returning passages, for returning the balls 14 rolling along the loaded ball rolling grooves 20 in parallel thereto. The ball returning passage A has substantially a circular section having an inner diameter slightly larger than that of the ball 14.

Figure 2:
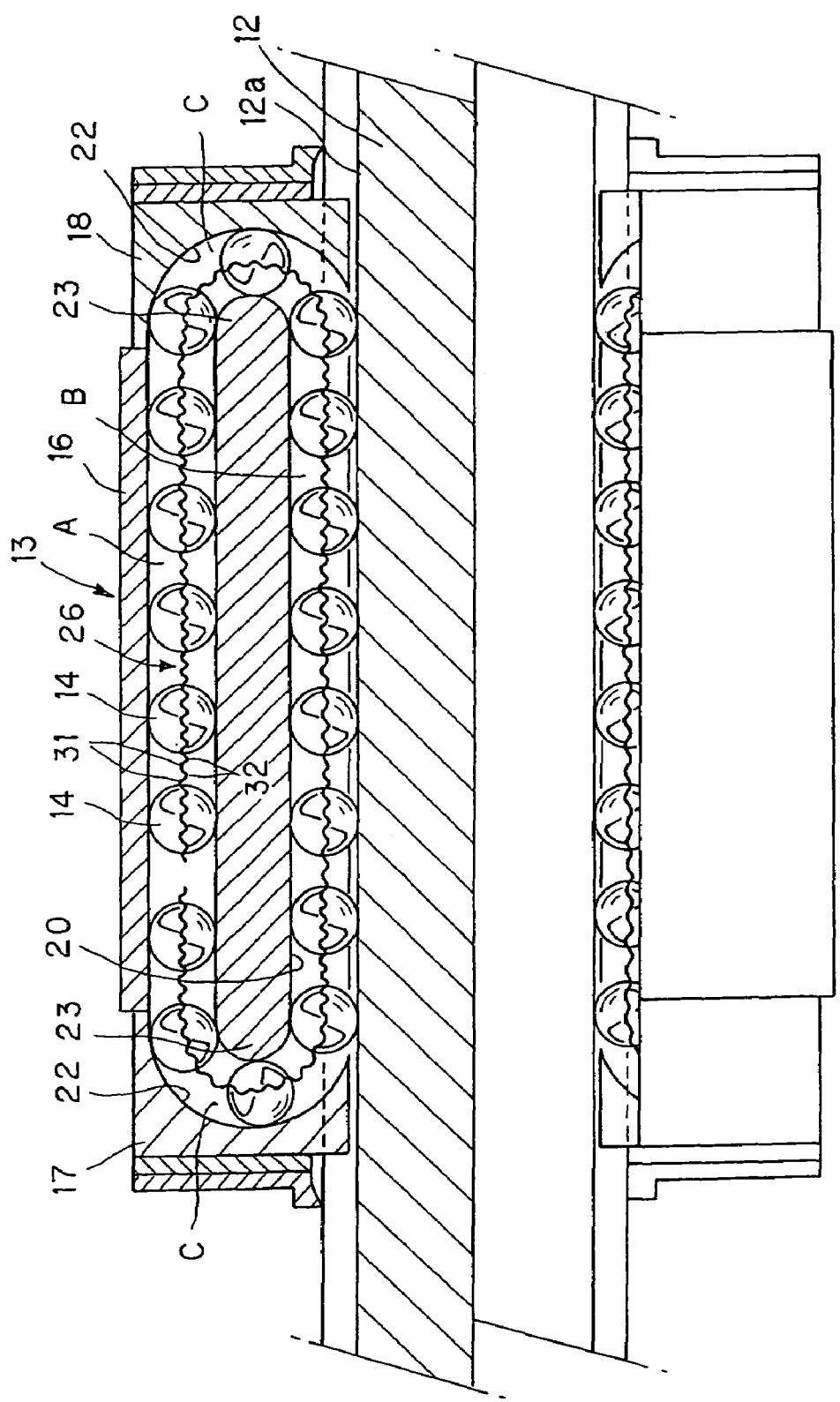
FIG. 2 is a sectional view, in a longitudinal direction, of a track rail of the linear guide of FIG. 1.

Each of the end plates 17 and 18 has a sectional shape substantially identical to the cross-sectional shape of the movable block body 16. As shown in FIG. 2, a rolling member rolling direction changing passage having U-shape is formed at each end portion of the movable block body 16 for guiding the balls 14 by scooping up the balls 14 rolling along the loaded ball rolling passage 20 to the ball return passage A or vise versa. That is, each rolling direction changing passage is composed of an outer peripheral side surface 22 formed in the end plate 17 (18) and an inner peripheral side surface as an R-piece portion 23 formed on each of both end portions of the movable block body 16 in the advancing direction. When the end plates 17 and 18 are mated each other and assembled to the movable block body 16, these outer and inner peripheral side surfaces 22 and 23 constitute U-shaped direction changing passages C at both ends of the movable block body 16 so as to connect the non-loaded return passage A and the loaded ball rolling passage B (which is constituted by the ball rolling groove 12a and the non-loaded ball rolling groove 20). Thus, as mentioned above, by combining the non-loaded return passage A, the loaded rolling passage B and the U-shaped direction changing passages C, the ball circulation passage in form of circuit is constituted.

The movable block body 16 may be formed through the injection molding of metal material, or manufactured by a machine working including drawing, cutting and/or grinding working. Further, the end plates 17 and 18 may be also manufactured by injection-molding metal material or resin material.

The plural balls 14, 14, - - - disposed and arranged in the ball circulation passage are held by a rolling member connection belt 26 to be rotatable. The rolling member holding belt 26 is manufactured, for example, by pressmolding a thin metal plate such as stainless steel plate for spring.

With reference to FIG. 3 (FIGS. 3A and 3B) showing the details of the rolling member connection belt 26, the rolling member connection belt 26 has a shape extending in its longitudinal direction so as to hold a series of balls 14. The longitudinal end portions thereof are formed to have round portions for smoothly inserting the rolling member connection belt 26 into the passage formed in the movable block 13.

The rolling member connection belt 26 is formed with a plurality of ball accommodation holes 26a along its longitudinal direction. Claw portions 27a, 27a, 27b, 27b, - - - are formed to the peripheral portions of the ball accommodation holes 26a so as to surely hold the balls 14, respectively. That is, four claws 27a, 27a, 27b, 27b are formed to each of the ball accommodation holes 26a so as to extend inside the hole 26a in a manner such that a pair of claws 27a, 27a arranged to diagonal positions are folded in one direction from a flat plane side on which the rolling member connection belt 26 lies and the other pair of claws 27b, 27b are also folded in the other direction to thereby form a ball holding structure.

As can be seen from FIG. 3, the rolling member connection belt 26 has a corrugated structure in which a plurality of peak portions 31, 31, - - - and valley portions 32, 32, - - - alternatively appear in sets in its longitudinal direction "L" in FIG. 3A so as to be expandable or contractable (flexible) in its longitudinal direction. Each of the peak and valley portions 31 and 32 extends in its width direction "W" normal to the longitudinal direction L. Within a range (diameter) "D" in the longitudinal direction of the ball accommodation hole 26a of the rolling member connection belt 26, there exist a plurality of sets of the corrugated peak and valley portions 31 and 32 as shown in FIG. 3B. In other wards, the length "D" in the longitudinal direction of the hole 26a is larger than the pitch between the adjacent peaks 31 or valleys 32.

Further, in an alternation, the rolling member connection belt 26 has such corrugated shape partially in its longitudinal direction in place of the entire length thereof. Furthermore, the corrugated shape is not limited to that shown in FIG. 3B and other shapes such as sine-curve shape, circular-arc shape or triangular-saw-teeth shape may be adopted as far as it includes plural sets of peak-and-valley arrangements.

Figure 4:
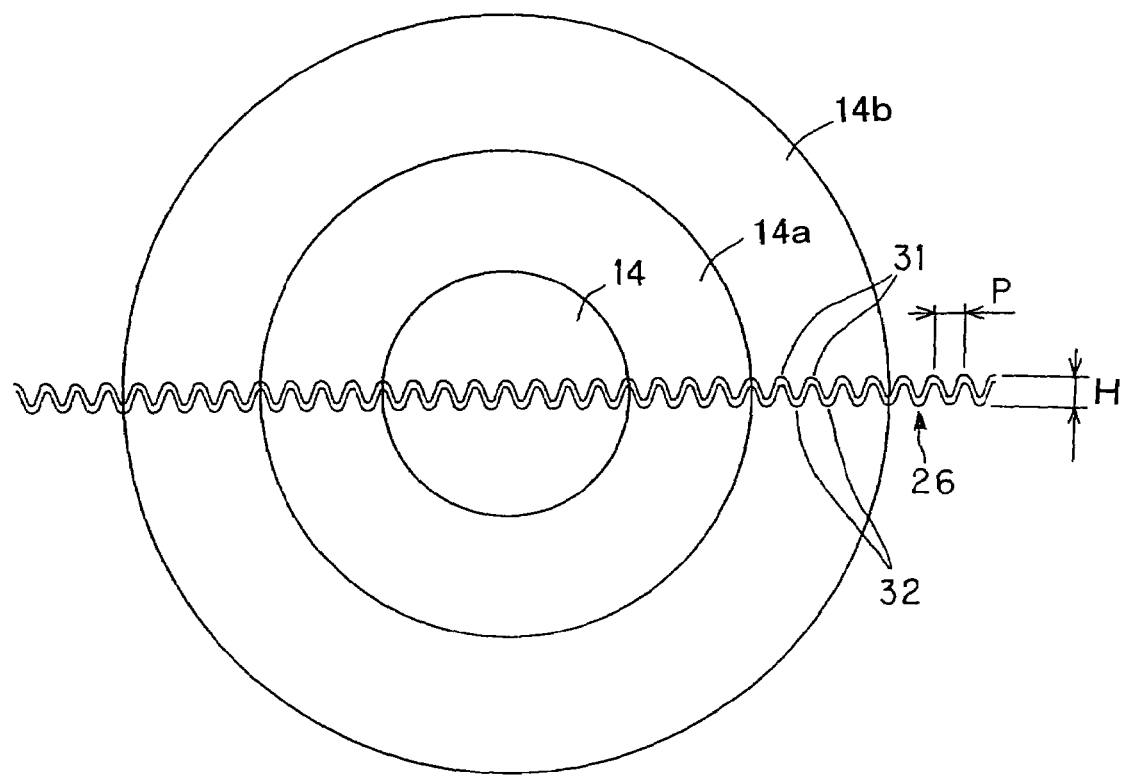
FIG. 4 is an illustrated side view showing another example of the rolling member connection belt.

FIG. 4 shows another example of the rolling member connection belt 26. In this example, the pitch P between the peak portions 31 or valley portions 32 is made substantially equal to the thickness H (i.e., height between the top of the peak portion 31 and the bottom of the valley portion 32) of, for instance, 0.3 mm. This pitch P is made extremely small in comparison with various sizes of balls 14, 14a, 14b, - - -, and a plurality of peak and valley portions 31 and 32 exist within the range "D" of the ball accommodation hole 26a in the longitudinal direction of the rolling member (ball) connection belt 26.

Figure 5:
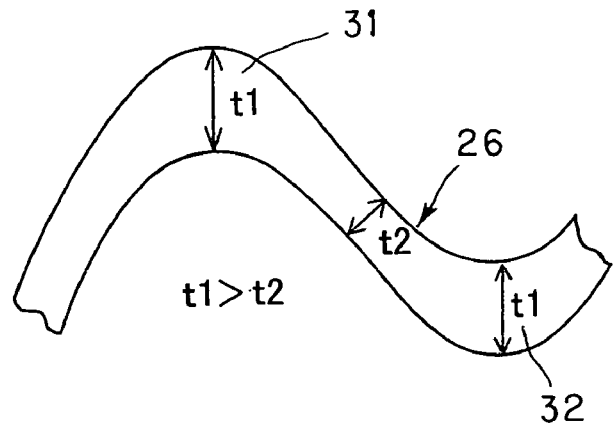
FIG. 5 is an illustrated side view showing a further example of the rolling member connection belt.

FIG. 5 shows another example of the rolling member connection belt 26. In this example, the thickness t1 of the rolling member connection belt 26 at the peak portion 31 and the valley portion 32 is larger than the thickness t2 (t1>t2) at an intermediate portion 33 connecting the peak and valley portions 31 and 32. According to this example, the rolling member connection belt 26 is made to be more flexible or easily bendable at its intermediate portion 33 and, hence, the rolling member connection belt 26 will be more easily expanded or contracted in its longitudinal direction.

Incidentally, as shown in FIG. 2 and as mentioned before, the circulation passage or path, along which the balls 14, 14, - - - roll, has a circuit structure composed of the linearly extending loaded rolling passage B, the linearly extending non-loaded return passage A and a pair of U-shaped direction changing passages C connecting the passages A and B. This circuit-shaped circulation passage lies in one plane, and the rolling member connection belt 26 is arranged so that the width direction "W" thereof is normal to the plane in which the ball circulation passage exists. The ball circulation passage is provided with a guide groove for guiding both lateral ends of the rolling member connection belt 26.

According to the movement of the movable block 13 along the track rail 12, the rolling member (ball) connection belt 26 together with the balls 14 is moved, while being loaded, from one end to the other end of the loaded rolling passage B, thereafter, scooped up by one end plate 18 at one end and then returned to the non-loaded return passage A via one direction changing passage C. The rolling member connection belt and the balls 14 are thereafter returned to the other one end of the loaded rolling passage B via the other direction changing passage C. Thus, the rolling member connection belt 26 is moved, in the linearly extending shape, in the loaded rolling passage B and the non-loaded return passage A, and on the other hand, is moved, in the bent fashion in the U-shaped direction changing passages C. During such circulation motion in the ball circulation passage, the rolling member connection belt 26 repeats the above-mentioned motion.

According to the described embodiments, the rolling member connection belt 26 has a corrugated shape having peak-and-valley portions 31 and 32 each extending in its width direction and arranged in its longitudinal direction, thus being easily bent in the direction changing passage. Accordingly, the rolling member connection belt 26 can easily and smoothly circulate in the circuit-shaped circulation passage. On the other hand, the rigidity in the width direction of the rolling member connection belt 26 increases, so that the balls 14 can be suppressed from being drifted or wandering during their circulation motion.

Further, the balls 14, 14, - - - may change in their speeds at the time when the balls 14 move from the non-loaded return passage A and the non-loaded area constituted by the direction changing passage C to the loaded area constituted by the loaded rolling passage B, or from the loaded area to the non-loaded area. In addition, because of the corrugated shape of the rolling member connection belt 26 expandable in its longitudinal direction, the change in speed can be absorbed and, hence, the transferring motion of the balls 14, 14, - - - from the non-loaded area to the loaded area will be smoothly performed.

Moreover, according to the embodiments of the rolling member connection belt 26 of the present invention, the injection molding of the resin material can be performed substantially with no difficulty for manufacturing a compact rolling member connection belt, and the strength at the connecting portion of the rolling member holding member (retainer) and the belt can be ensured substantially with no problem. Thus, the rolling member connection belt having compact and sufficient strength can be provided. Moreover, since the rolling member connection belt is formed of metal material, it is usable at a high temperature even of more than 100° C.

Figure 6:
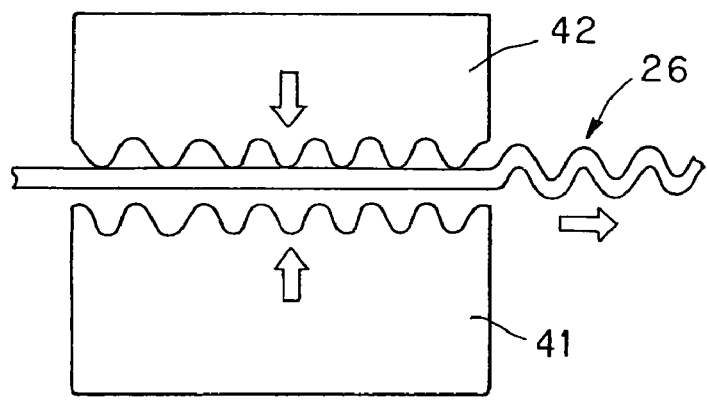
FIG. 6 is an illustration showing one example of a method of manufacturing the rolling member connection belt.
Figure 7:
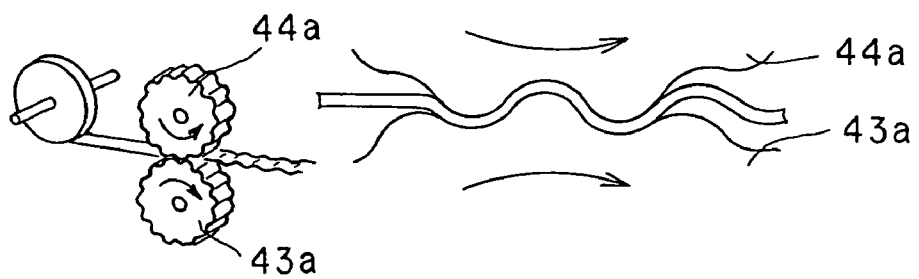
FIG. 7 is an illustration showing another example of a method of manufacturing the rolling member connection belt.
Figure 8:
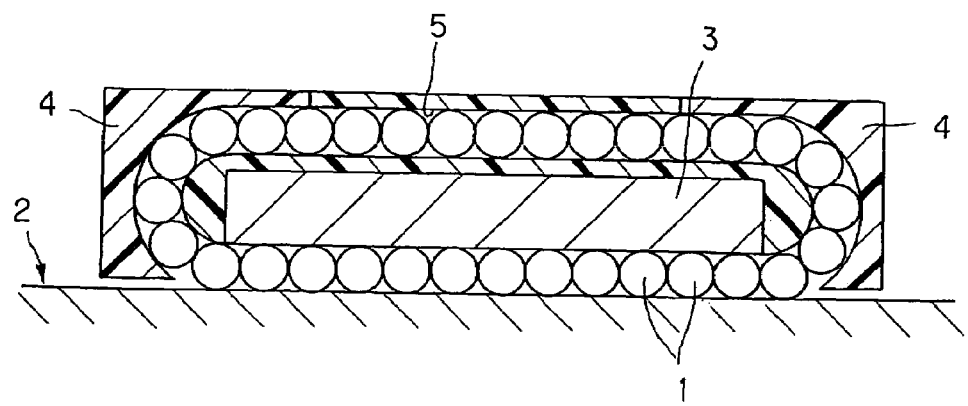
FIG. 8 is an illustrated sectional view showing a ball circulation path of one example of a conventional linear guide.
Figure 9:
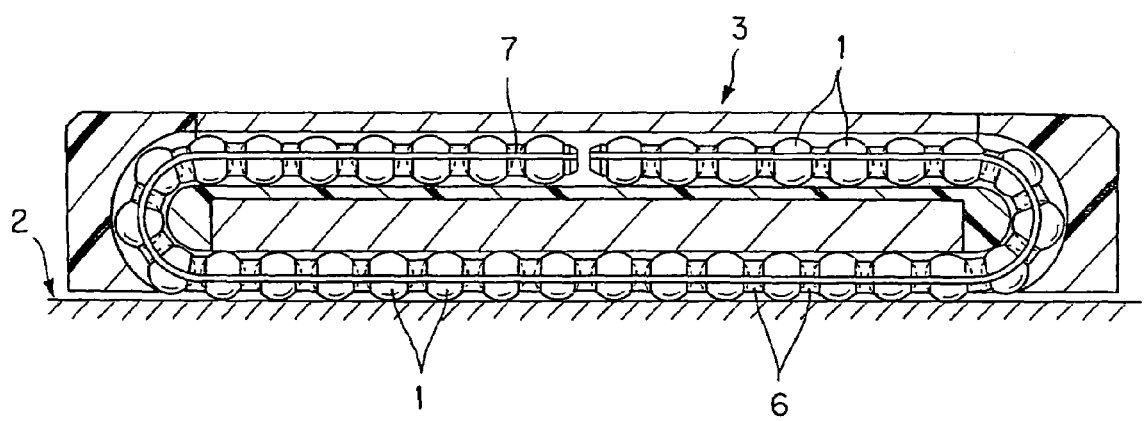
FIG. 9 is a sectional view of the conventional linear guide showing a ball circulation state.

FIGS. 6 and 7 represent a method of manufacturing the rolling member connection belt 26 of the structure mentioned above. The corrugated shape of the rolling member connection belt 26 is formed, for example, as shown in FIG. 6, through the press-working in which the flat connection belt is squeezed between lower and upper dies 41 and 42 to which corrugated shapes are formed. This press-working will be carried out after punching a metal plate into a flat belt shape or before punching the metal plate. Furthermore, the corrugated shape may be formed to the rolling member connection belt 26 by, as shown in FIG. 7, drawing out the metal belt from a roll and then clamping it between a pair of roll dies formed with corrugated shapes.

Further, it is to be noted that the present invention is not limited to the described embodiments and many other changes and modifications without departing from the scopes of the appended claims.

For example, although, in the described embodiment, single row of ball rolling groove is formed to each of the side surfaces of the track rail 12, the number of rows and their arrangement may be optionally changed in consideration of magnitude of load and direction of loading. Furthermore, the sectional shape of the track rail 12 may be changed, and in addition, rollers may be utilized in place of balls as rolling members.

The present application claims priority under 35 U.S.C § 119 to Japanese Patent Application No. 2003-52936 filed Feb. 28, 2003 entitled "ROLLING MEMBER CONNECTION BELT AND MOTION GUIDE DEVICE PROVIDED WITH SAME". The contents of that application are incorporated herein by reference in their entirety.

What is claimed is:

1. A motion guide device comprising:
a track member formed with a first rolling member rolling portion;
a movable member formed with a second rolling member rolling portion and assembled to the track member to be movable relatively thereto;
a plurality of rolling members which circulate in a circulation passage, said circulation passage comprising a loaded rolling passage composed of both the first and second rolling member rolling portions formed on the track member and the movable member respectively, a non-loaded return passage formed in the movable member and a pair of rolling direction changing passages connecting the loaded rolling passage and the non-loaded return passage;
a rolling member connection belt holding the plurality of rolling members to be rotatable in the circulation passage, said rolling member connection belt being made of a metal plate member which has a corrugated-shape in a longitudinal cross-section,
wherein said corrugated-shape is formed in at least a portion of a longitudinal direction of the metal plate member, and
wherein said corrugated-shape includes peak and valley portions each extending in a direction normal to the longitudinal direction of the metal plate member.

2. The motion guide device according to claim 1, wherein said peak and valley portions are formed along an entire longitudinal direction of the connection belt.

3. The motion guide device according to claim 1, wherein said metal plate member is provided with a plurality of rolling member holding holes formed along the longitudinal direction of said metal plate member, and
wherein a diameter of said plurality of rolling member holding holes is greater than a pitch between adjacent said peak and valley portions.

4. The motion guide device according to claim 3,
wherein each of plurality of rolling member holding holes is provided with a plurality of claw portions formed at peripheral portions thereof, and
wherein each of said claw portions holds one of said plurality of rolling members in one of said rolling member holding holes.

* * * * *